United States Patent [19]

Schlanger et al.

[11] Patent Number: 4,779,007
[45] Date of Patent: Oct. 18, 1988

[54] UNINTERRUPTED POWER SUPPLY SYSTEM

[75] Inventors: William J. Schlanger, Laguna Beach; Steven E. Schlanger, El Toro, both of Calif.; Donald K. Nakano, Kailua, Hi.; Victor V. Vurpillat, Laguna Niguel, Calif.

[73] Assignee: Unison Technologies, Inc., Mission Viejo, Calif.

[21] Appl. No.: 14,705

[22] Filed: Feb. 13, 1987

[51] Int. Cl.⁴ .................... H02J 7/00; H02M 7/538
[52] U.S. Cl. ................................. 307/66; 307/64; 363/132
[58] Field of Search .............. 307/64, 66; 363/37, 363/126, 132

[56] References Cited

U.S. PATENT DOCUMENTS

| | | | |
|---|---|---|---|
| 3,614,461 | 10/1971 | Speer | 307/64 |
| 3,805,139 | 4/1974 | Hoffman, Jr. et al. | 307/66 X |
| 3,912,940 | 10/1975 | Vince | 307/64 |
| 3,999,077 | 12/1976 | Borkovitz et al. | 307/66 |
| 4,065,711 | 12/1977 | Kawabata | 307/66 X |
| 4,104,538 | 8/1978 | Davies, Jr. | 307/66 X |
| 4,238,691 | 12/1980 | Ebert, Jr. | 307/66 |
| 4,401,895 | 8/1983 | Petkovsek | 307/66 |
| 4,485,434 | 11/1984 | Beeston et al. | 363/132 |
| 4,506,766 | 3/1985 | Watanabe | 307/66 X |
| 4,516,035 | 5/1985 | Rhoads et al. | 307/66 |
| 4,709,317 | 11/1987 | Itzuka et al. | 363/37 |

FOREIGN PATENT DOCUMENTS

2111326 6/1983 United Kingdom ............... 307/66

Primary Examiner—William M. Shoop, Jr.
Assistant Examiner—Sharon D. Logan
Attorney, Agent, or Firm—Loyal M. Hanson

[57] ABSTRACT

A power supply system for providing uninterrupted AC power includes a first input port to which to couple AC input power at a specified RMS voltage level from a primary power source, a second input port to which to couple DC input power at a specified voltage level from a backup power source, and an output port to which to connect a device to be powered. A fullwave rectifier generates a first direct current from the AC input power, and up-converter generates a second direct current from the DC input power at an RMS voltage level approximately equal to that of the AC input power, and a switching arrangement couples a selected one of the first and second direct currents to the output port according to whether the AC input power is stabilized or interrupted, so that the flow of current to the output port is periodically reversed thereby generate AC output power. Switching may by synchronized with each zero crossing of the AC input power. A microprocessor in one form of the invention generates a reference waveform, compares it to the waveform of the AC input power, and selects one of the first and second direct currents according to whether the AC input power is interrupted or stabilized.

22 Claims, 10 Drawing Sheets

UNINTERRUPTED POWER SUPPLY SYSTEM

CROSS-REFERENCES TO RELATED APPLICATIONS

This application is related to the copending application Ser. No. 014,626, filed herewith entitled "Ring Detector" and to U.S. Pat. No. 4,760,277, filed herewith entitled "Computer Backup Power Supply."

BACKGROUND OF THE INVENTION

1. Technical Field

The invention described in this application relates generally to power supplies, and more particularly to a new and improved system providing an uninterrupted source of alternating current.

2. Background Information

Interruptions in AC input power, including voltage level variations beyond predefined limits, often produce unacceptable equipment operation. For example, a glitch in AC power supplying a conventional personal computer may result in lost data and other computer malfunctioning. This may cause extreme inconvenience and expense and thus, a clean uninterrupted source of power is often desired.

Various types of backup power supplies exist for this purpose. One type, commonly called an off-line supply, utilizes a set of batteries driving an up-converter to provide an independent source of AC power. A mechanical or electrical switching arrangement transfers to the off-line supply if there is a failure in AC power, and thus operation of the equipment being powered can continue.

Although effective in many respects, the off-line supply has certain drawbacks that need to be overcome, most notably the switchover time involved. It may take on the order of five to ten milliseconds to switch over to the backup supply, and this time lag often results in malfunctioning of the equipment being powered. In addition, the switching arrangement often results in transients that tend to further induce malfunctioning. Consequently, it is desirable to have a new and improved backup system that overcomes these concerns.

Another type of backup power supply, commonly called an on-line supply, rectifies the AC power to provide a DC current, converts the DC current back to AC, and then transforms the AC to the voltage level required by the equipment being powered. A set of batteries connected through a diode switching arrangement to the input of the converter takes over if there is an AC power failure and thus, effects of the interruption are minimized.

Although switchover time is significantly reduced, the on-line supply has certain other drawbacks. For example, it typically utilizes an input transformer for reducing the input AC voltage so that the voltage level of the rectified current is the same as the battery voltage, a converter for converting the DC to AC, and an output transformer for increasing the voltage to the desired output level. Each of these components is usually somewhat large, inefficient, and relatively expensive. Consequently, it is desirable to have a new and improved system that overcomes these concerns also—one that is more effective that combines increased efficiency with decreased size and cost.

SUMMARY OF THE INVENTION

This invention recognizes the problems associated with the prior art and provides a new and improved container with the desired attributes.

Briefly, the above and further objects of the present invention are realized by rectifying the AC input power without changing voltage level, up-converting the DC input power to the AC voltage level, and switching a selected one of the two resulting DC currents to the output through an output bridge to construct AC output power. This is done with novel circuitry combining increased efficiency and functionality with reduced size and cost in a new and improved uninterrupted power supply system.

Generally, the system includes a first input port to which to couple AC input power at a specified RMS voltage level from a primary power source, a second input port to which to couple DC input power at a specified voltage level from a backup power source, and an output port to which to connect a device to be powered.

A fullwave rectifier generates a first direct current from the AC input power, a high frequency up-converter generates a second direct current from the DC input power at an RMS voltage level approximately equal to that of the AC input power, and a novel switching arrangment generates the AC ouput power from a selected one of the first and second currents. This is done according to whether the AC input power is stabilized or interrupted, and so that the flow of current to the output port is periodically reversed to thereby generate the AC output power.

According to one aspect of the invention, reversal of the first direct current is synchronized with each zero crossing of the AC input power so that the AC output power has a generally similar waveform. According to another aspect, reversal of the second direct current is synchronized with each zero crossing before switching back to the first direct current so that the AC output power is generally in phase with the AC input power before switching back to the first direct current. Yet another aspect provides a microprocessor that generates a reference waveform, compares it to the waveform of the AC input power, and selects one of the first and second direct currents according to whether the AC input power is interrupted or stabilized.

Thus, this invention overcomes many drawbacks associated with the prior art. Control is precise. Conversion is efficient. The generation of uninterrupted output power is effective, and the system weighs and costs less.

Accordingly, it is an object of the invention to provide a new and improved system for generating an uninterrupted AC output power despite interruptions in the AC input power.

It is an object to provide such a system that accomplishes this by switching to a backup source of power quickly, in significantly less time than four milliseconds, substantially immediately.

Another object is to provide such a system that is efficient.

Yet another object of the invention is provide such a new and improved system that is relatively lightweight and inexpensive.

DESCRIPTION OF THE PREFERRED EMBODIMENTS

Figure 1:
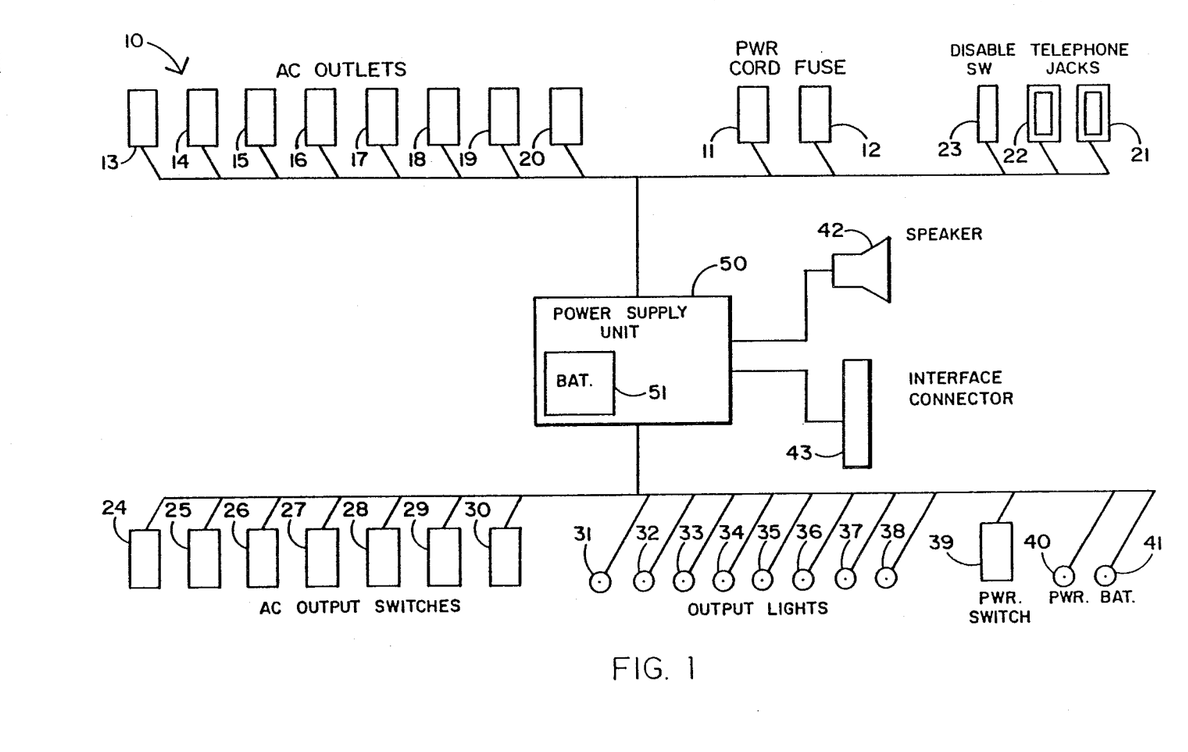
FIG. 1 of the drawings is a block diagram providing an overview of external connections and controls of a system constructed according to the invention.

Referring now to FIG. 1, there is shown a system 10 constructed according to the invention. The system 10 is designed to receive sixty Hertz alternating current (AC) at a root-mean-square (RMS) voltage level of one hundred twenty volts from a conventional power line, and to generate an uninterrupted supply of similar AC output power for powering one or more devices, such as a conventional personal computer system, despite power line interruptions. It is housed in a case (not shown) that has a size and shape adapted to be placed atop a conventional personal computer, and it is provided with a complement of external connections and controls to enhance functionality.

More specifically, back panel features include a line cord 11 for connection to the AC power line, a line fuse 12 for protective purposes, and a series of AC outlets 13–20 into which to plug equipment to be powered. Also, a pair of telephone jacks 21 and 22 are provided for use in interconnecting the system 10 to a conventional telephone line for remote turn-on purposes, and a switch 23 is included to disable the remote turn-on feature.

Front panel features include a series of rocker switches 24–30 for switching AC ouput power to respective ones of the outlets 13–20, and a group of output indicator lights 31–38 for indicating when respective ones of the outlets 13–20 are turned on. A power switch 39 activates the system 10, a power-on light emitting diode, LED 40, lights when the system 10 is on, and an LED 41 flashes in the event of AC input power failure, as will be subsequently discussed. For operator convenience, the rocker switch 24 turns on both the outlet 13 and the outlet 14, to enable one-switch activation of both a personal computer plugged into the outlet 13 and a monitor plugged into the outlet 14 (not shown).

In addition to the front and back panel features, the system 10 includes a speaker 42 that beeps when the AC input power to the system 10 is interrupted, and an interface connector 43 for use in accessing various control signals generated by a power supply unit 50 that forms the core of the system 10.

The power supply unit 50 generates AC output power from the AC input power until the AC input power is interrupted, and then from direct current (DC) supplied by a backup battery 51. Once the AC input power is stabilized, the unit 50 switches back to the AC input power. This is done effectively, efficiently, and with less component weight and cost utilizing a novel combination of elements to be subsequently described in more detail.

Thus, the system 10 combines many desirable external features with the new and improved power supply unit 50 so that the system 10 is particularly well suited for powering such devices as personal computers, peripheral equipment, and other equipment involving operator control such that the external features are desired. However, a system constructed according to the invention may employ many other configurations without departing from the inventive concepts disclosed. According to one aspect of the invention, for example, the unit 50 can be used apart from many of the external features described above without foregoing the improved output power produced.

Figure 2:
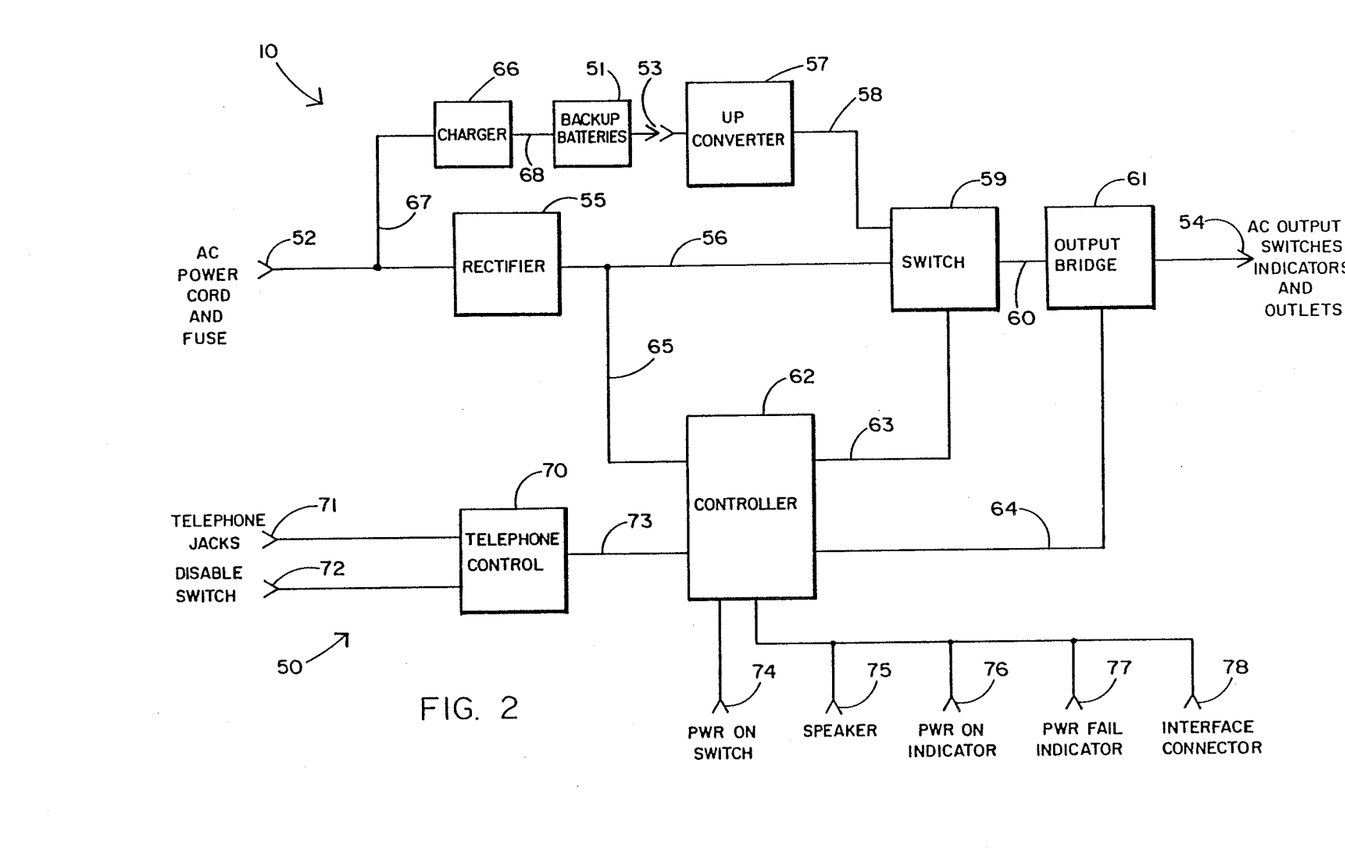
FIG. 2 is a block diagram of the power supply unit.

Further details of the unit 50 are illustrated in block diagram form in FIG. 2. Generally, the unit 50 includes an input port 52 to which to couple AC input power at a specified RMS voltage level from a primary power source. In the system 10, the input port 52 is coupled to the line cord 11 by the switch 39 (FIG. 1), and the AC input power for which the system 10 is designed is one hundred twenty volt, sixty Hertz AC power. However, a power supply unit can be constructed according to the invention to utilize other voltage levels and frequencies within the inventive concepts disclosed.

A second input port 53 is included (FIG. 2) to which to couple DC input power at a specified voltage level from a backup power source, such as the battery 51 in the unit 50. In the system 10, the input port 53 is wired to the battery 51 which supplies DC power at a voltage level of twenty-four volts. However, a power supply unit according to the invention can be designed to use a battery supplying DC power at a different voltage level.

Also, the battery 51 in the illustrated system 10 is a series of six-volt batteries mounted within a case on a chassis adjacent a circuit board on which various components of the unit 50 are mounted (not shown). However, this arrangement may be altered. DC input power at a different voltage may be utilized, the number of batteries used may be different, and they may be mounted externally, for example.

In addition to the two input ports 52 and 53, the unit 50 includes an output port 54 to which to connect a device to be powered (not shown). In the system 10, the output port 54 is selectively coupled to one or more of the outlets 13–20 by operation of one or more of the rocker switches 24–30 (FIG. 1). Through these three ports 52–54 is directed the flow of power. Either AC input power coupled to input 52, or DC input power coupled to input port 53 is used to generate AC ouput power that is coupled to output port 54.

The invention employs a novel circuit for doing this. AC input power is rectified by fullwave rectifier 55 to generate a first direct current on a line 56, and the DC input power is converted by high frequency up-converter 57 to generate a second direct current on a line 58 (FIG. 1). The first and second direct currents can be precisely controlled to produce uninterrupted AC output power. They are coupled by respective ones of lines 56 and 58 to a switching arrangement that includes a switch 59 coupled by a line 60 to an output bridge 61, and a controller arrangement or controller 62 coupled by a line 63 to the switch 59 and by a line 64 to the output bridge 61.

The switching arrangement serves as means for coupling a selected one of the first and second direct currents to the output port 54 according to whether the AC input power is stabilized or interrupted, and for periodically reversing the flow of the selected direct current to the output port 54 to thereby generate AC output power. In the unit 50, this is accomplished with a novel controller 62 to which the first direct current is coupled by a line 65. The controller 62 senses the first drrect current to detect whether the AC input power is stabilized or interrupted and to detect each zero crossing, i.e., the moment when the AC input power reverses direction, and based on this the controller 62 causes the switch 59 and the output bridge 61 to switch as desired to generate uninterrupted AC output power despite interruptions in the AC input power.

In doing this, the controller 62 causes the first direct current to be coupled through the switch 59 to the output bridge 61 if the AC input power is stabilized. If the AC input power is interrupted, the controller 62 causes the second direct current to be coupled through the switch 59 to the output bridge 61. When the AC input power stabilizes, the first direct current is again coupled through the switch 59 to the output bridge 61.

In addition, the controller 62 causes the output bridge 61 to reverse the direction of current flow to the output port 54 in synchronism with each zero crossing. In the case of the first direct current, reversal is synchronized with each zero crossing. In the case of the second direct current, reversal is brought into synchronism once the AC input current is stabilized before switching back to the first direct current. This is done by slightly extending or shortening the reversal period over a plurality of cycles, ten to twelve cycles for example, until synchronism is attained.

Various criteria can be set to define when the AC input power is stabilized and when it is interrupted. According to one aspect of the invention, this is done by comparing the AC input power to the waveform of a microprocessor generated reference signal. Accordingly, a microprocessor portion of the controller 62 to be subsequently discussed stores a table of data indicative of a half sine wave from which is generated a reference signal in phase with the AC input power.

The output of a voltage divider having an input connected to the first direct current is compared with the reference signal, and if the instantaneous voltage level at the output of the voltage divider falls below that of the reference signal an interruption-indicating signal is generated and the switching arrangement controlled accordingly. In addition, the instantaneous voltage level is compared against a corresponding maximum value, and if this maximum value is exceeded, the interruption-indicating signal is generated as well. The AC input power is continually monitored in this way, and when it is again stabilized for a predefined period, ten seconds for example, the first direct current is again coupled to the output port 54.

Thus, precise switching control is achieved at speeds on the order of several microseconds.

In addition to the foregoing, the unit 50 includes a battery charger 66 that receives AC input power coupled from the input port 52 over a line 67. The battery charger 66 generates a trickle charge current that is coupled over a line 68 to the battery 51, and this is used to keep the battery 51 charged.

Also, the unit 50 includes a ring detector 70 that serves as means for activating the the unit 50 in response to a ring signal or an off-hook signal coupled by telephone lines connected to the input port 71. This is done for remote turn-on purposes, and it is accomplished by coupling the ring detector 70 to the input port 71 which includes the telephone jacks 21 and 22 (FIG. 1). In addition, the ring detector 70 is coupled to an auxiliary port 72 that is in turn coupled to the switch 23 (FIG. 1). The ring detector 70 generates a control signal in response to a ring signal or an off-hook signal coupled to the port 71 if the switch 23 is off. This signal is coupled to the controller 62 over a line 73, and the controller 62 then activates the unit 50.

Several additional auxiliary ports 74–78 may be included for coupling to respective ones of the switch 39, the LED's 40 and 41, the speaker 42, and the interface connector 43 that were described in reference to FIG. 1. Of course, various ones of these added features may be omitted without departing from the inventive concepts otherwise embodied in the unit 50.

Figure 3:
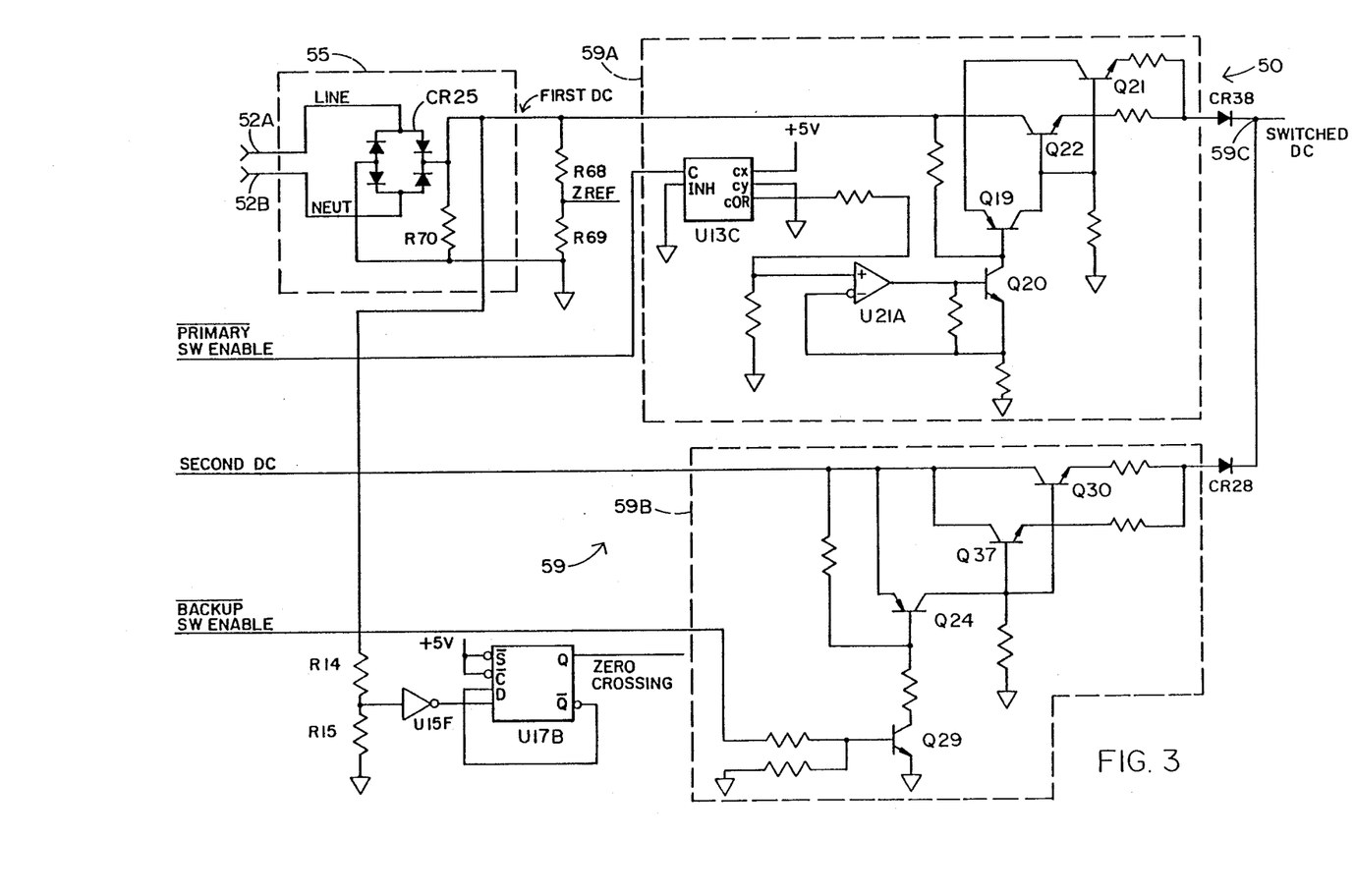
FIGS. 3–9 combine to form a schematic circuit diagram of an exemplary power supply unit.

Further details of the unit 50 are shown in the schematic circuit diagram in FIGS. 3–9. Referring first to FIG. 3, there is shown a circuit utilized in the rectifier 55 (FIG. 2). Sixty Hertz AC input power at an RMS voltage level of one hundred twenty volts is coupled to a pair of lines 52A and 52B of the input port 52 from the power cord 11 and fuse 12 illustrated in FIG. 1. The lines 52A and 52B are coupled a rectifier bridge CR25 which generates a full wave rectified first direct current across a load resistor R70. These components are enclosed by dashed lines labeled reference numeral 55 to indicate that they correspond to the rectifier 55 in FIG. 2, and the first direct current is designated FIRST DC.

The first direct current is coupled from the load resistor R70 to a voltage divider consisting of a pair of resistors R14 and R15 to develop a voltage of approximately five volts that is coupled to a Schmitt trigger U15F which fires at one hundred twenty Hertz in synchronism with each half wave of the first direct current. The output of the Schmitt trigger U15F is coupled to a flipflop U17B that generates a control signal designated a ZERO CROSSING signal at sixty Hertz that is used to indicate each zero crossing of the AC input power.

The output of the flipflop U17B, the ZERO CROSSING signal, is coupled to a microprocessor U11 that is used for control purposes as is subsequently discussed with reference to FIG. 7.

The first direct current is also coupled to a voltage divider consisting of a pair of resistors R68 and R69 to develop a reference a signal designated ZREF. This signal is coupled to a comparator U16A to be subsequently discussed with reference to FIG. 8 that is used in comparing ZREF to a synthesized reference signal for purposes of detecting an interruption in AC input power.

The first direct current is coupled from the load resistor R70 to a switching circuit enclosed in dashed lines designated reference numeral 59A to indicate that the circuit is a portion of the switch 59 in FIG. 2. It employs known circuit design techniques and components for selectively switching the first direct current in response to a control signal designated PRIMARY SW ENABLE. This signal is received from the microprocessor U11 in FIG. 7.

Briefly, the PRIMARY SW ENABLE signal activates a multiplexer component U13C, the output of which is coupled to an operational amplifier U21A connected to a transistor Q20 in a constant current configuration. The output of U21A turns on Q20 which turns on a high voltage driver transistor Q19. Q19 turns on a pair of high voltage, high current transistors Q21 and Q22, and thus the first direct current is selectively switched through a diode CR38 to a node 59C that corresponds to the line 60 in FIG. 2.

A second switching circuit enclosed in dashed lines labeled reference numeral 59B constitutes a second portion of the switch 59 that is used to switch the second direct current. Using circuitry similar to the switch portion 59A described above, a control signal designated BACKUP SW ENABLE that is received from the microprocessor U11, activates a pair of driver transistors Q29 and Q24 which turn on a pair of switching transistors Q30 and Q37 that are similar to Q21 and Q22. The switching transistors Q30 and Q37 switch the second direct current designated SECOND DC through a diode CR28 to the node 59C.

The switch portions 59A and 59B are activated alternately by the microprocessor U11. Thus, by activating an appropriate one of PRIMARY SW ENABLE and BACKUP SW ENABLE, the microprocessor U11 can switch a selected one of the first and second direct currents to the node 59C as the signal SWITCHED DC. The first switch portion 59A and second switch portion 59B employ known circuit design techniques and components for this purpose that is not described in further detail.

Figure 4:
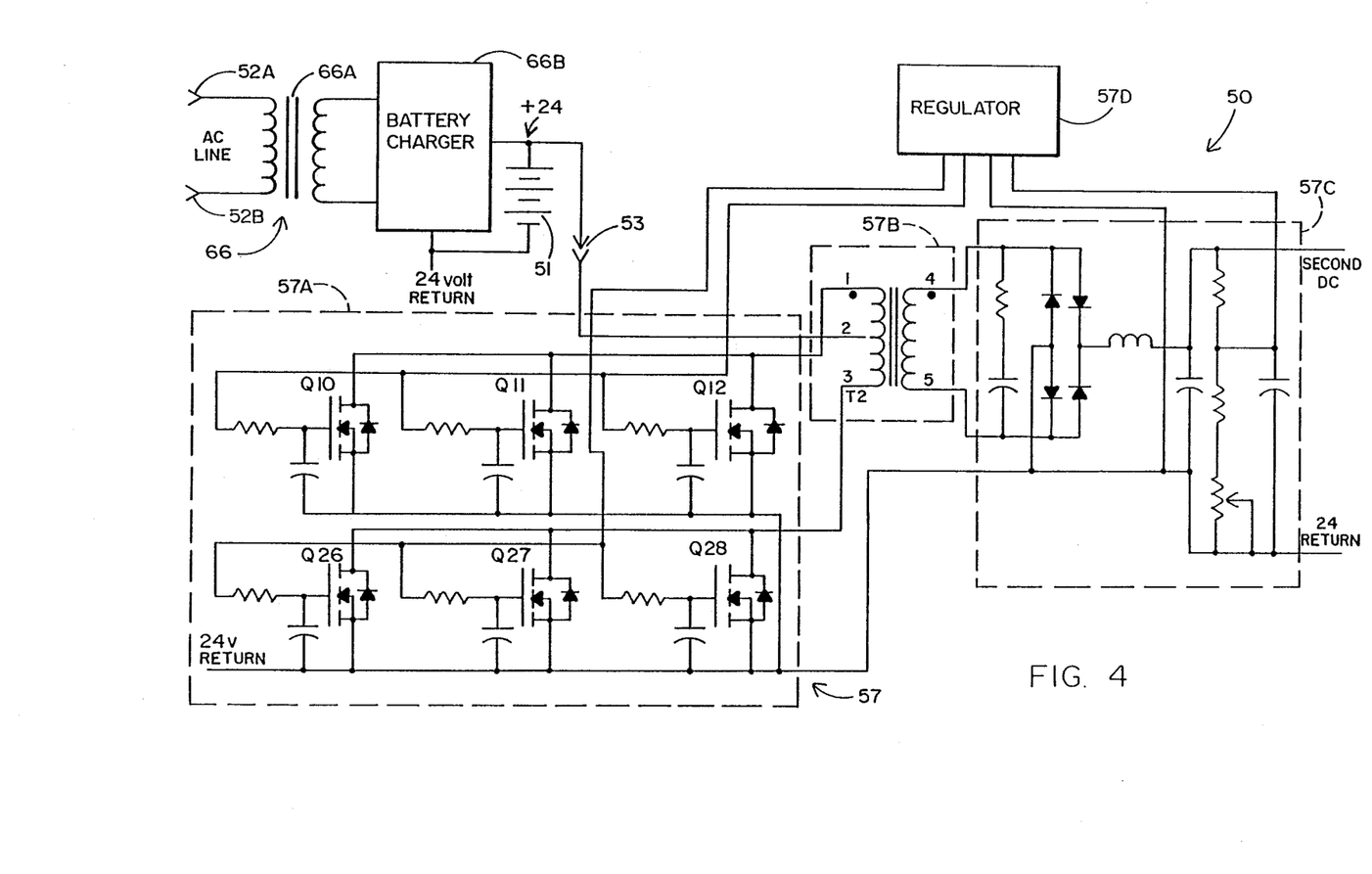

Considering now FIG. 4, there is shown circuitry employed in the up-converter 57 described above with reference to the block diagram in FIG. 2. Bateery 51 is connected between input port 53 and the input port 53 to produce the signal designated "+24". This is the backup DC input power, and the battery return is designated 24V RETURN.

The +24 is coupled from the input port 53 to an oscillator portion 57A of up-converter 57. The oscillator portion 57A employs suitable means, such as series of MOSFET's Q10-12 and Q26-28 in a push-pull oscillator configuration, to generate a fifty kilohertz output signal that is coupled to a high frequency transformer 57B. The oscillator portion 57A utilizes design techniques and components known in the art to do this, and it is not described in further detail.

The transformer 57B is an efficient device that contributes to the efficiency, lightweight, and reduced cost of the system 10. It is an available component, such as a EC-51 ferrite core transformer weighing about two hundred fifty grams and taking the form of a five centimeter cube. The output is coupled to a rectifier portion 57C of the up-converter 57 that rectifies and filters the fifty kilohertz output of the transformer 57B to generate a one hundred thirty volt second direct current signal designated SECOND DC. This signal is coupled to the switch 59. A high frequency current mode regulator 57D provides regulation according to known techniques utilizing known components and circuitry that are not described in detail.

FIG. 4 also illustrates the battery charger 66. AC input power one the lines 52A and 52B of the input port 52 is coupled by suitable means such as a stepdown transformer 67A, and this is coupled to a rectifier 66B that combines with the transformer 66A to form the charger 66. The stepdown transformer 66A and rectifier 66B employ known design techniques and components to achieve a trickle charged current that is coupled across the battery 51 for charging purposes, and further details of these components are not described.

Figure 5:
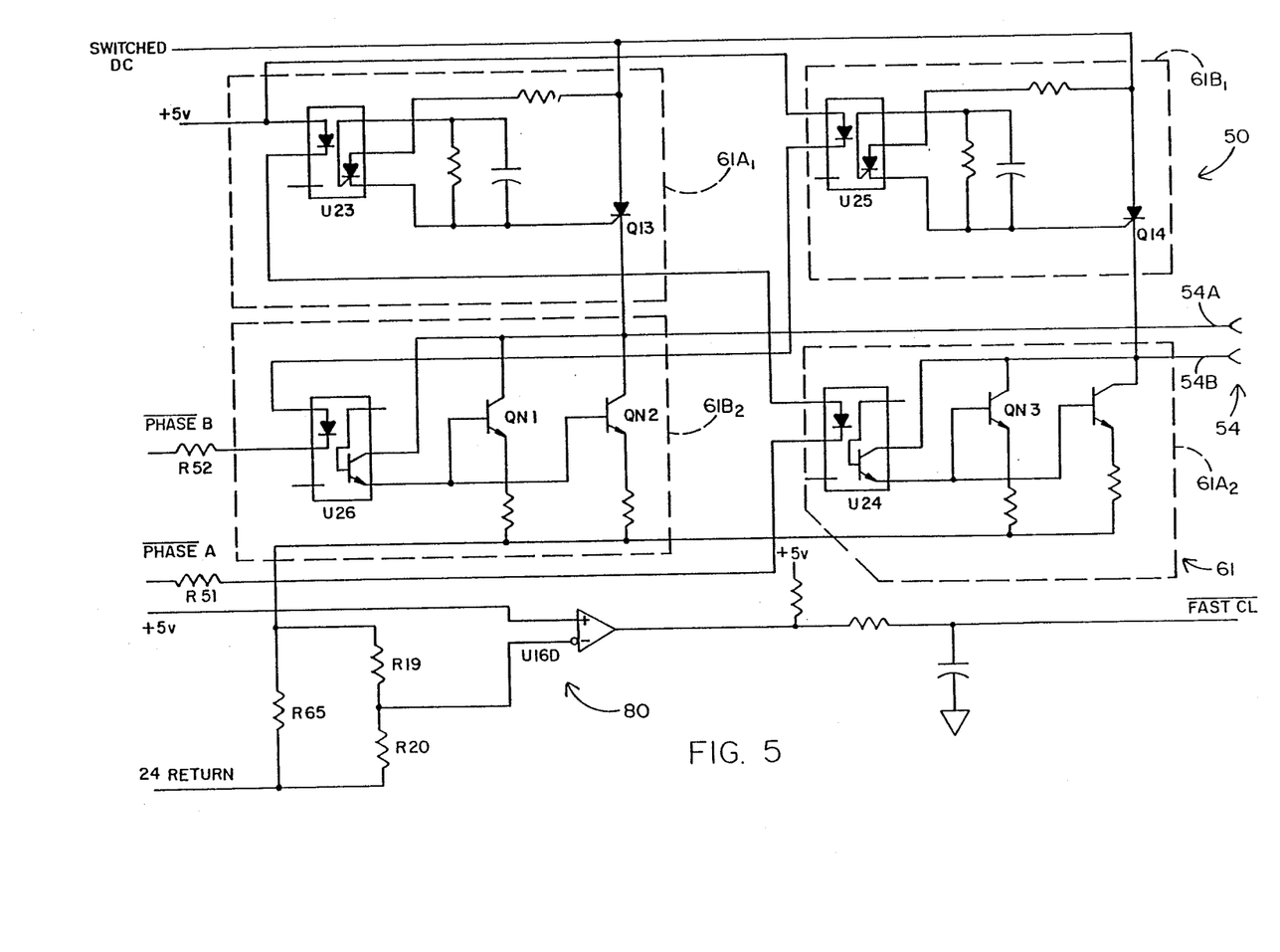

Considering now FIG. 5, the SWITCHED DC from the node 59C at the output of the switch portions 59A and 59B (FIG. 3) is coupled to the output bridge 61. The output bridge 61 includes four sections or legs enclosed in dashed lines labeled respectively 61A$_1$, 61A$_2$, 61B$_1$, and 61B$_2$. These are activated alternately by a pair of PHASE A and PHASE B control signals from the microprocessor U11 to generate the AC output power.

The PHASE A signal is coupled through a resistor R51 to activate a pair of optocouplers U23 and U24, that switch the SWITCHED DC through the legs 61A$_1$ and 61A$_2$. U23 is a silicon-controlled-rectifier (SCR) optocoupler, such as a General Electric H11C3, and U24 is a transistor optocoupler, such as a General Electric H11D3. When the PHASE A control is in the on state (low), current from a five-volt supply passes through the optocouplers so that U23 fires SCR Q13 and U24 turns on a pair of high current switching transistors QN3 and QN4, such as the commercially available transistors designated SGS 00030. This results in an output current flowing out the line 54A and in the line 54B of the ouput port 54.

Similarly, the PHASE B signal is coupled through a resistor R52 to activate another pair of optocouplers U24 (similar to U26) and U23 (similar to U23) to fire SCR Q14 and turn on another pair of transistors QN1 and QN2 that are similar to QN3 and QN4. This results in an output current flowing out the line 54B and in the line 54A of the output port 54. Thus, alternating the PHASE A and PHASE B control signals produces AC output power, and this is done at a sixty Hertz rate to generate sixty Hertz AC output power. The PHASE A control signal and the PHASE B control signal are generated by an output toggle circuit activated by the microprocessor U11 as is subsequently discussed with reference to FIG. 6.

The unit 50 includes an overcurrent shut down circuit 80, also. The circuit 80 includes a resistor R65 having a low resistance value, such as two tenths ohms, across which a voltage is developed by the current flowing from the SWITCHED DC line to ground, which in the illustrated embodiment is connected to the 24 RETURN. This voltage is divided by a voltage divider consisting of a pair of resistors R20 and R19, and the output of this voltage divider is compared with a five volt reference signal coupled to a comparator U160 to generate a control signal designated FAST CL that is used to turn off the unit 50 in the event of an overcurrent condition.

Figure 6:
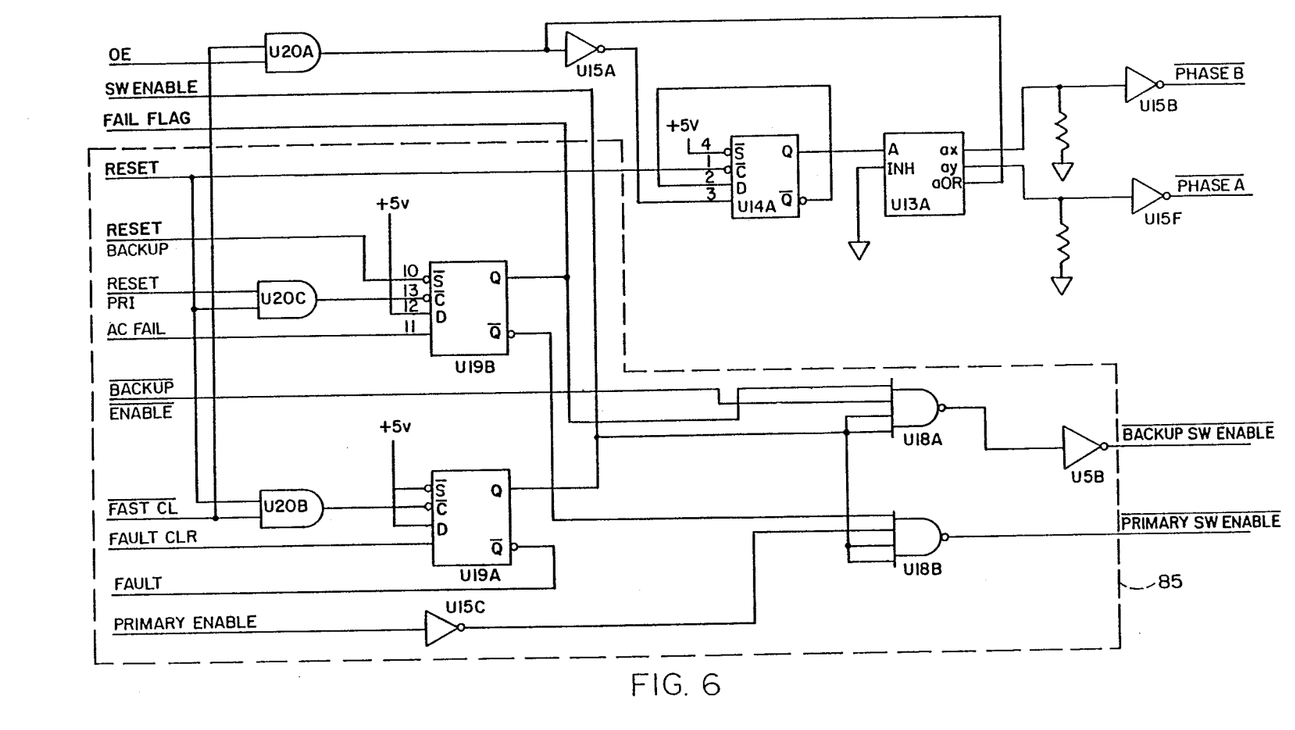

Considering now FIG. 6, the FAST CL signal is coupled to an AND gate U20A, along with an output enabling signal from the microprocessor U11 designated OE. The output of the AND gate U20A is coupled through an inverter U15A to a flipflop U14A that combines with a selector U13A to generate the PHASE A and PHASE B control signals. The outputs of U13A is inverted by inverters U15B and U15F so that the control signals are low when active.

A control signal from the microprocessor U11 designated RESET clears the flipflop U14A when power is turned on. When the FAST CL signal is inactive and the 0E signal is active, one of the PHASE A and PHASE B signals are activated. The microprocessor U11 causes the 0E signal to activate periodically in synchronism with the AC input power, or, when the AC input power is interrupted, at approximately the same rate. The output of selector U13A alternates accordingly, and thus, the PHASE A and PHASE B signals are activated alternately at the same rate to result in periodic reversal of current flow to the output port 54.

The microprocessor U11 also generates a pair of signals designated PRIMARY ENABLE and BACKUP ENABLE. These signals activate the corresponding one of switch portions 59A and 59B (FIG. 3). The microprocessor U11 activates PRIMARY EN- ABLE when the AC input power is stabilized, and the BACKUP ENABLE signal when the AC input power is interrupted as is subsequently discussed.

A RESET PRIMARY signal from the microprocessor U11 and the RESET signal are coupled to the input of an AND gate U20C. The output of U20C, a RESET BACKUP signal from the microprocessor U11, and an AC FAIL signal generated by a comparator U16A that is subsequently discussed with reference to FIG. 8, activate flipflop U19B.

The Q output of the flipflop U19B provides a control signal designated FAIL FLAG that indicates a failure in AC input power. This signal, a BACKUP ENABLE signal and the Q output of a overcurrent flipflop U19A are coupled to the AND gate U18A. Activation of the AND gate U18A by these signals produces and output that is inverted by an inverter U5B, the output of which is the signal designated BACKUP SW ENABLE. This is the signal that activates the switch portion 59B in FIG. 3.

The not Q output of the flipflop U19B is coupled to the AND gate U18B, along with the Q output of flipflop U19A and the PRIMARY ENABLE signal after it is inverted by an inverter U15C. The output of the AND gate U18B is the signal designated PRIMARY SW ENABLE that activates the switch portion 59A in FIG. 3.

The flipflop U19A is activated by a FAULT CLEAR signal from the microprocessor U11, and the output of an AND gate U20B that is activated by the RESET signal and the FAST CL overcurrent indicating signal. The FAULT CLEAR signal is generated by the microprocessor U11, and it clears the flipflop U19A, while the not Q output of the flipflop U19A provides FAULT signal that is coupled back to the microprocessor U11.

Thus, the microprocessor U11 provides a series of control signals that are combined in the logic circuitry 85 utilizing known design techniques and components to accomplish the desired novel combination of control signals employed. Under microprocessor control, the PHASE A and the PHASE B signals are activated alternately, and the BACKUP SW ENABLE and PRIMARY SW ENABLE signals are activated according to whether the AC input power is stabilized or interrupted as determined by in a manner that is subsequently discussed.

Figure 7:
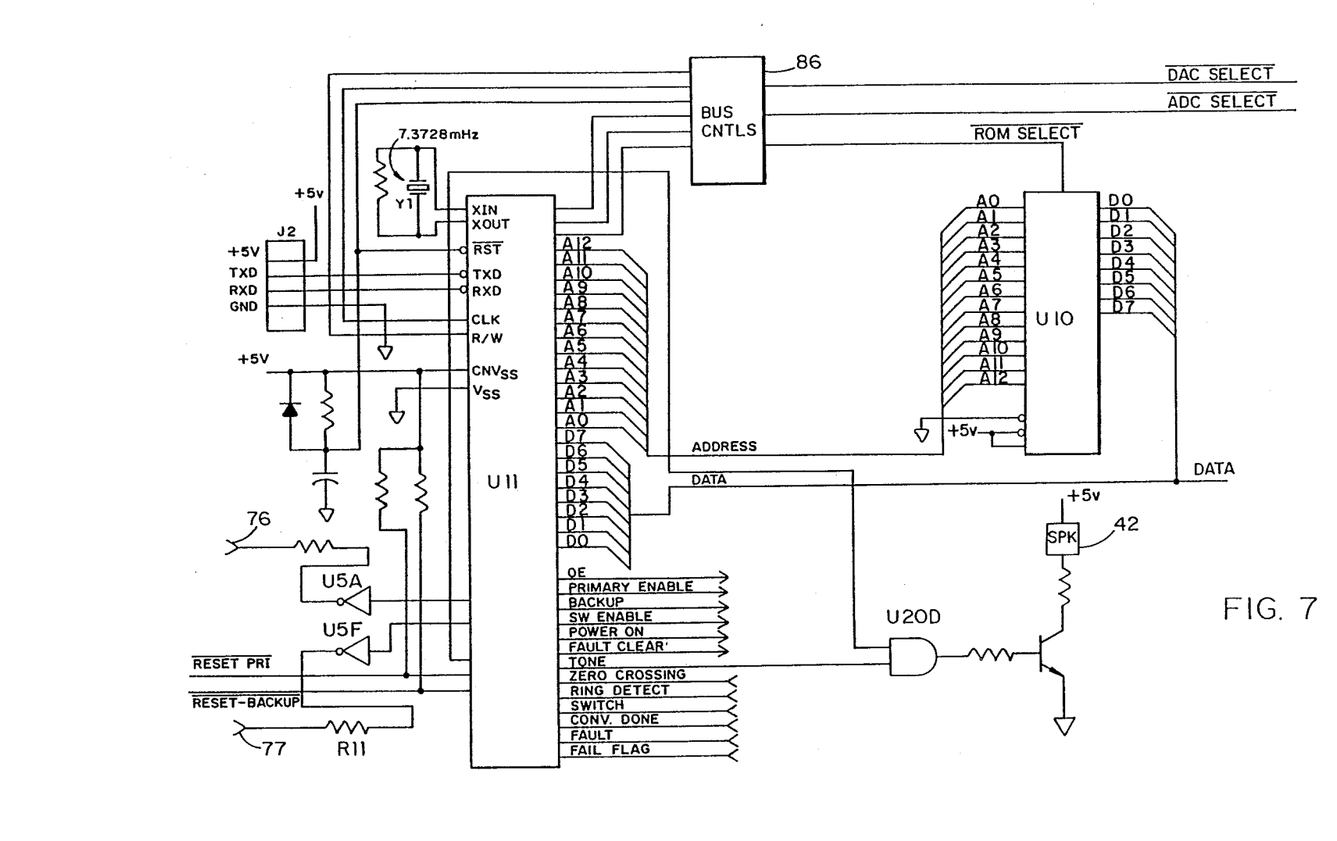

Considering now FIG. 7, the microprocessor U11 may employ a commercially available microprocessor chip, such as a Mitsubishi 50747 single chip microprocessor. This and the other logic circuitry described form the core of the controller 62 mentioned with reference to FIG. 2. The microprocessor U11 utilizes a clock crystal Y1 and suitable five-volt power supply connections. An interface connector J2 is provided for accessing indicated ones of the microprocessor terminals.

The microprocessor U11 receives and generates the control signals described. It is coupled to an address bus and a data bus that are coupled to an eight kilobyte read-only-memory (ROM) chip U10, and to both an analog-to-digital (ADC) chip U8 and a digital-to-analog (DAC) chip U12 that are subsequently discussed with reference to FIG. 8. One output of the microprocessor U11 is coupled through an inverter U5A to output port 76 to light the power indicator, and another is coupled through inverter U5F to output port 77 to light the battery indicator. A pair of microprocessor outputs are coupled to AND gate U20D to drive the speaker 42 so that it beeps when the microprocessor U11 switches over to backup power.

The microprocessor U11 is programmed to receive and generate the various control signals indicated and thereby perform the functions described according to known programming techinques.

A group of logic components form a bus control circuit 86 according to known techniques, and the output of this circuit provides a group of DAC SELECT, ROM SELECT, and ADC SELECT signals. These function in a known manner in conjunction with the ROM chip U10, the ADC chip U8, and the DAC chip U12 as part of the bus interface.

Figure 8:
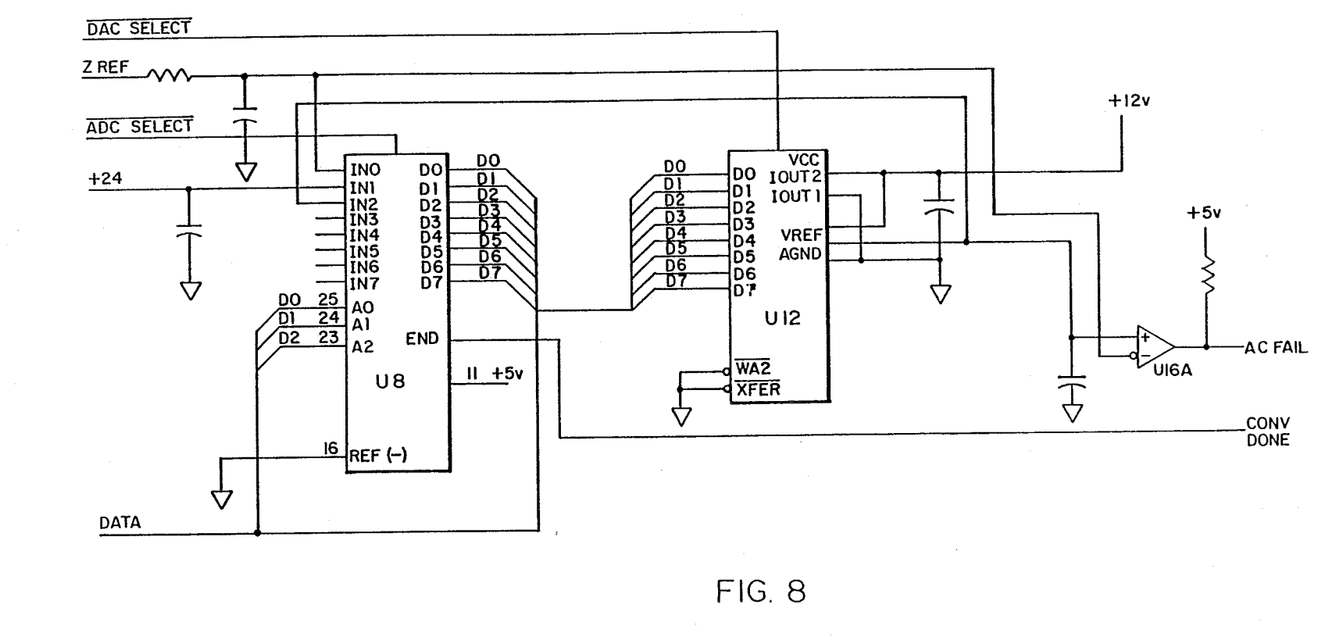

The ADC chip U8 and the DAC chip U12 are illustrated in FIG. 8. These are commercially available components, such as National Semiconductor ADC 0809 and DAC 0832. The DATA bus from the microprocessor U11 is coupled to both of them, the ADC SELECT signal to the ADC U8, and the DAC SELECT signal to the DAC U12. The ZREF signal (from rectifier 55 in FIG. 3) is also coupled to both for use in determining whether the AC input power is stabilized or interrupted.

The ADC U8 converts the ZREF signal to data that the microprocessor U11 analyzes to compare the FIRST DC signal to a predetermined minimum voltage, such as one hundred eight volts, and a predetermined maximum voltage, such as one hundred twenty-eight volts. If ZREF indicates that the FIRST DC signal is outside of these limits, the microprocessor U11 switches to the backup battery supply. The ADC U8 also converts the +24 and if this voltage falls below eighteen volts, the unit 50 is shut down indicating a battery failure. A CONV DONE signal is coupled from the ADC U8 to the microprocessor U11 to indicate when the ADC U8 has completed a sampling.

The DAC U12 converts data stored in the ROM chip U10 a time varying reference signal designated VREF that is in desired phase relationship with the AC input power, i.e., in phase. This VREF signal is coupled to the comparator U16A which activates the AC FAIL signal if the instantaneous value of ZREF falls below VREF.

Of course, other means of generating a time varying signal may be employed, such as an oscillator synchronized with the ZERO CROSSING signal. In addition, other means and criteria for determining whether the AC input power is stabilized or interrupted may be employed without departing from various other inventive aspects of the invention.

Thus, the unit 50 provides precise determination of an interruption condition and switches to backup power accordingly, quickly and accurately. The generation of the FIRST DC signal and the up-conversion of the DC input power combines with the novel switching and output bridge arrangement to enable this to be done in a far superior manner.

Figure 9:
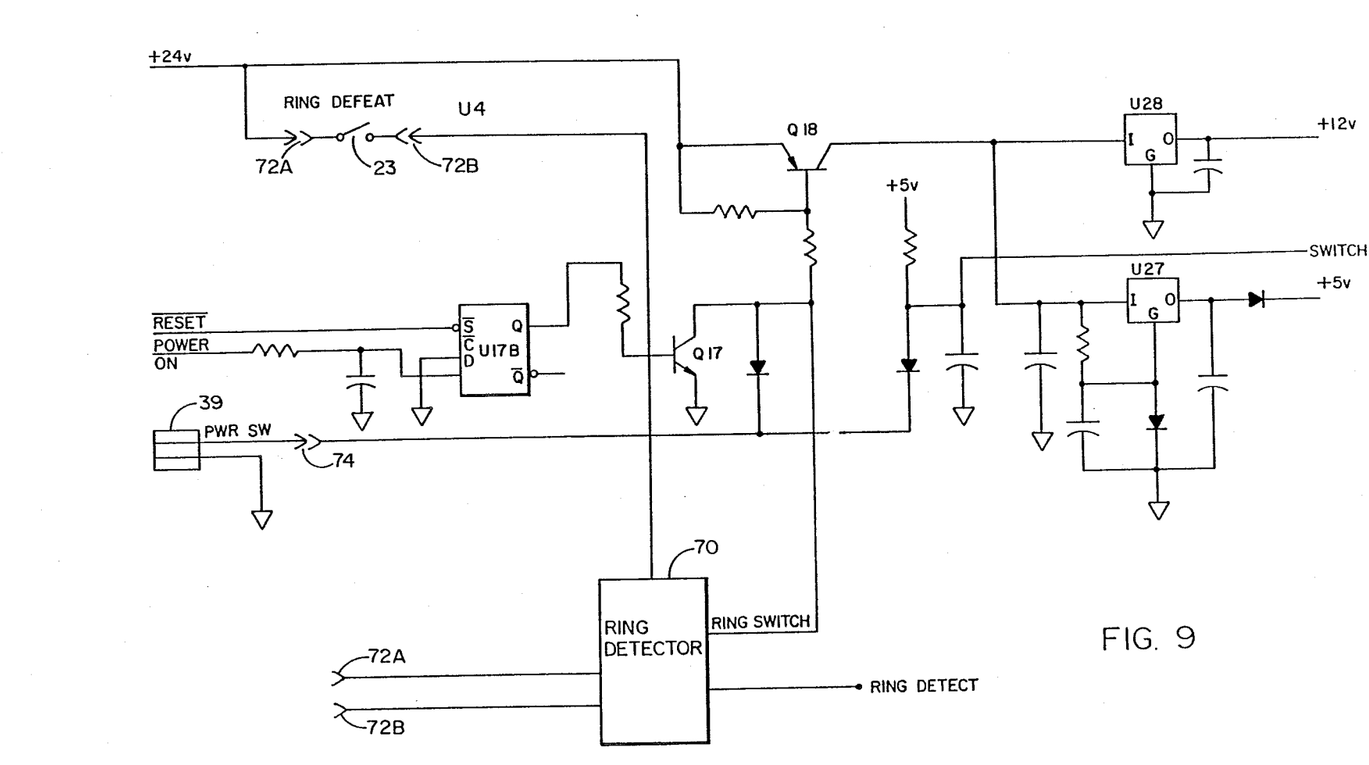

The illustrated unit 50 also includes a telephone line interfacing circuit illustrated in FIG. 9. This is used to turn on the unit 50 from a remote location by a ring on the telephone lines. Thus, a personal computer connected to the system 10 can be activated at will from a remote location.

First, the unit 50 is turned on manually by activating the power switch 39. This switches port 74 to ground, and this turns on a PNP power transistor Q18 that couples the +24V to a twelve-volt regulator U28 and a five-volt regulator U27. The +12V output of the regulator U28 provides power for the up-converter 57 and some analog functions, and the +5V output of the regulator U27 provides power for the microprocessor U11 and other logic circuits.

Activation of the power switch 39 also activates a control signal designated SWITCH, which is coupled to the microprocessor U11. The microprocessor U11 then generates a signal designated RESET that activates a flipflop U17B to latch the power transistor Q18 on. Latching is necessary, in part, because the power switch 39 is of the momentary contact type. The POWER ON signal clears the flipflop U17B to turn power off.

A ring detector circuit 70 turns on the unit 50 in response to a ring signal or off-hook signal received on a pair of conventional telephone lines coupled to lines 72A and 72B of port 72. These lines are coupled to the ring detector, which is powered by the +24V signal coupled through the ring defeat switch 23 to the ring detector 70. When the defeat switch 23 is in an enabling position, a ring signal or off-hook signal on the telephone lines is detected by the ring detector 70 which then generates a RING SWITCH control signal and a RING DETECT control signal.

When this happens, the RING SWITCH control signal turns on the power transistor U28 to turn on the unit 50. Also, the RING DETECT control signal is coupled to the microprocessor U11, and the microprocessor U11 activates the RESET signal to latch the power transistor U28 on. The microprocessor U11 is suitably programmed to retain the unit 50 on for a desired period of time after the ring signal and off-hook signal are no longer active on the telephone lines. Then, the unit 50 is turned off.

The ring detector 70 may employ known circuitry, or the novel arrangement disclosed in the copending application identified above entitled "Ring Detector." That application is incorporated herein by reference for the details of the ring detector circuit it describes.

Figure 10:
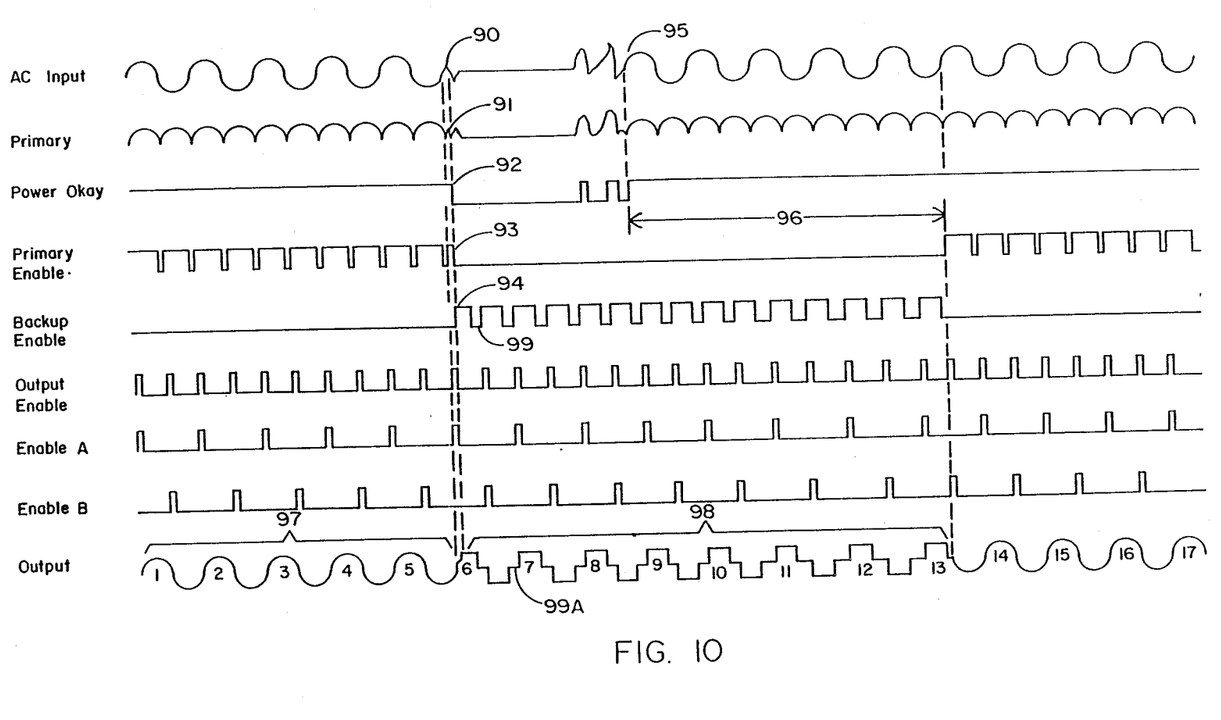
FIG. 10 is a timing diagram showing the timing relationship of various signals in the power supply unit.

The representative signals illustrated in FIG. 10 provide an overview of the timing the microprocessor U11 is programmed to accomplish. The signal designated AC INPUT represents the AC input power received at input port 52. The signal designated PRIMARY represents the FIRST DC signal generated by fullwave rectification of the AC input power. These two signals are generally in phase so that each zero crossing of the FIRST DC signal occurs at the same time as a corresponding zero crossing of the AC input power.

The signal designated POWER OK represents the condition existing when the AC FAIL signal is not activated. When the AC input power is interrupted, as indicated at 90, the interruption is reflected in the FIRST DC signal as indicated at 91. This is reflected in the ZREF signal and causes the comparator U16A to activate the AC FAIL signal. This is represented at 92 where the POWER OK signal goes inactive.

As long as the POWER OK signal is active, the PRIMARY ENABLE signal goes high at each zero crossing of the AC input power to turn on switch portion 59A and thereby couple the FIRST DC signal to the output bridge 61. When the POWER OK signal goes inactive, the PRIMARY ENABLE signal goes inactive also, as indicated at 93. At the same time, the BACKUP ENABLE signal goes active, and this turns on the switch portion 59B every half-cycle to couple the SECOND DC signal to the output bridge 61.

The signal designated OUTPUT ENABLE represents the OE signal generated by the microprocessor U11. It is synchronized to each zero crossing of the AC input power when the AC input power is stabilized. During periods when the AC input power is interrupted, the microprocessor U11 times this signal so that switching occurs approximately every half-cycle of the AC input power. When the AC input power is again stabilized, as indicated at 95, the POWER OK signal is activated and the OE signal is adjusted by the microprocessor U11 over approximately ten to twelve cycles, as indicated at 96, to synchronize the transistion with each zero crossing of the AC input power before the PRIMARY ENABLE is again activated.

The signal designated ENABLE A represents the PHASE A signal. It goes active at every other zero crossing to switch the output bridge 61 for output current flow in one direction. The signal designated ENABLE B represents the PHASE B signal, and it alternates with the PHASE B signal to switch the output bridge 61 for output current flow in the other direction.

The signal designated OUTPUT represents the AC output power generated at the output port 54. When the PRIMARY ENABLE signal is active, the FIRST DC (or PRIMARY) is switched by the output bridge 61 to reconstruct the waveform indicated at 97. When the BACKUP ENABLE signal is active, the SECOND DC signal is switched by the output bridge 61 to construct the waveform indicated at 98.

According to one aspect of the invention, the BACKUP ENABLE signal is switch under microprocessor control so that includes an off-period 99 that may be on the order of one millisecond in duration. This results in a corresponding off-period 99A in the AC output power that serves to reduce duty cycle and thereby transformer heating in a device being powered. Duty cycle reduction and other waveshaping techniques can be accomplished in the output bridge 61 by suitable means.

In one embodiment (not shown) the second direct current is produced so that it has a waveform similar to the first direct current. This is done according to known techniques, and the waveform of the first and second direct currents may be a fullwave rectified sinusiodal waveform such as that of the PRIMARY signal in FIG. 10. In this manner, the waveform of the AC output power is affected minimally by switching between the first and second direct currents.

Thus, the invention provides a new and improved system for generating uninterrupted AC output power that overcomes many drawbacks associated with the prior art. Control is precise. Conversion is efficient. The generation of uninterrupted output power is effective, and the system weighs and costs less.

Although an exemplary embodiment of the invention has been shown and described, many changes, modifications, and substitutions may be made by one having ordinary skill in the art without necessarily departing from the spirit and scope of this invention.

What is claimed is:

1. A power supply system for providing uninterrupted AC power, comprising:
   a first input port to which to couple AC input power at a specified RMS voltage level from a primary power source, a second input port to which to couple DC input power at a specified voltage level from a backup power source, and an output port to which to conenct a device to be powered;

fullwave rectifying means for generating a first direct current from the AC input power;

converting means for generating a second direct current from the DC input power at an RMS voltage level approximately equal to that of the AC input power; and switching means for coupling a selected one of the first and second direct currents to the output port according to whether the AC input power is stabilized or interrupted, and for periodically reversing the flow of the selected direct current to the output port to thereby generate AC output power;

wherein the switching means includes waveform analyzing means for comparing the instantaneous voltage level of the AC input power at each of a plurality of phase angles with a corresponding reference value and generating an interruption-indicating control signal if the instantaneous voltage level at any one of the phase angles falls below the corresponding reference value.

2. A system as recited in claim 1, further comprising:

first control means for controlling the switching means so that reversal of the first direct current flow to the output port occurs at approximately each zero crossing of the AC input power, to thereby cause the AC output power to have a waveform generally simulating the waveform of the AC input power.

3. A system as recited in claim 2, further comprising:

second control means for controlling the switching means so that the reversal of the second direct current flow to the output port is approximately synchronized with each zero crossing of the AC input power before the first input current is again coupled to the output port.

4. A system as recited in claim 1, wherein the switching means includes:

a plurality of first, second, third, and fourth switching means in an output bridge configuration having a pair of output nodes coupled to the output port and a pair of input nodes to which to couple the selected one of the direct currents, for defining four switchable legs of the output bridge; and means for switching selected ones of the legs of the output bridge periodically to reverse the current flow to the output port.

5. A system as recited in claim 4, wherein the switching means further includes:

fifth switching means for coupling the first direct current to the input nodes of the output bridge when the AC input power is stabilized; and sixth switching means for coupling the second direct current to the input nodes of the output bridge when the AC input power is interrupted.

6. A system as recited in claim 1, further comprising:

chopper means for causing the second direct current to have a duty cycle of less than one hundred percent so that AC output power derived from the second direct current a root-mean-square voltage value approximately equal to that of the the first direct current.

7. A system as recited in claim 1, wherein the waveform analyzing means includes:

waveform generating means for generating a time varying reference signal having a desired waveform; and comparing means for comparing the waveform of the AC input power to the waveform of the reference signal.

8. A system as recited in claim 7, wherein the waveform generating means includes:

microprocessor means, including memory means and digital-to-analog converter means, for storing a table of values indicative of the instantaneous voltage level of a desired waveform at a series of phase angles and for generating a time-varying signal according to the table of values against which to compare the waveform of the AC input power.

9. A system as recited in claim 8, further comprising:

analog-to-digital converter means for generating data indicative of an instaneous voltage level at each of a plurality of phase angles; and means for generating the interruption-indicating signal if the difference between the instantaneous voltage level of the AC input power and a corresponding instantaneous voltage level indicated by the data at any one of the phase angles exceeds a predetermined value.

10. A system as recited in claim 1, wherein:

the first direct current is unfiltered.

11. A system as recited in claim 1, wherein the converter means includes:

high frequency transformer means for greater efficiency.

12. A power supply system for providing uninterrupted AC power, comprising:

a first input port to which to couple AC input power at a specified RMS voltage level from a primary power source, a second input port to which to couple DC input power at a specified voltage level from a backup power source, and an output port to which to connect a device to be powered;

fullwave rectifying means for generating a first direct current from the AC input power;

converting means for generating a second direct current from the DC input power at an RMS voltage level approximately equal to that of the AC input power; and switching means for coupling a selected one of the first and second direct currents to the output port according to whether the AC input power is stabilized or interrupted, and for periodically reversing the flow of the selected direct current to the output port to thereby generate AC output power;

wherein the switching means includes waveform analyzing means for comparing the instantaneous voltage level of the AC input power at each of a plurality of phase angles with a corresponding reference value and generating a stabilized-indicating control signal if the instantaneous voltage level is within predetermined limits for a each of a predetermined number of cycles.

13. A power supply system for providing uninterrupted AC power, comprising:

a first input port to which to couple AC input power at a specified RMS voltage level from a primary power source, a second input port to which to couple DC input power at a specified voltage level from a backup power source, and an output port to which to connect a device to be powered;

fullwave rectifying means for generating a first direct current from the AC input power;

converting means for generating a second direct current from the DC input power at an RMS voltage level approximately equal to that of the AC input power;

switching means for coupling a selected one of the first and second direct currents to the output port according to whether the AC input power is stabilized or interrupted, and for periodically reversing the flow of the selected direct current to the output port to thereby generate AC output power;

first control means for controlling the switching means so that reversal of the first direct current flow to the output port occurs at approximately each zero crossing of the AC input power, to thereby cause the AC output power to have a waveform generally simulating the waveform of the AC input power; and second control means for controlling the switching means so that the reversal of the second direct current flow to the output port is approximately synchronized with each zero crossing of the AC input power before the first input current is again coupled to the output port;

wherein the second control means includes means for adjusting the switching period slightly so that the reversal of the second direct current flow to the output port becomes synchronized over a plurality of cycles with each zero crossing of the AC input power.

14. A power supply system for providing uninterrupted AC power, comprising:

a first input port to which to couple AC input power at a specified RMS voltage level from a primary power source, a second input port to which to couple DC input power at a specified voltage level from a backup power source, and an output port to which to connect a device to be powered;

fullwave rectifying means for generating a first direct current from teh AC input power;

converting means for generating a second direct current from the DC input power at an RMS voltage level approximaely equal to that of the AC input power;

switching means for coupling a selected one of the first and second direct currents to the output port according to whether the AC input power is stabilized or interrupted, and for periodically reversing the flow of the selected direct current to the output port to thereby generate AC output power;

on-off switch means for use in activating the system;

a third input port to which to couple a conventional telephone signal; and first remote turn-on means responsive to a ring signal coupled to the third input port for activating the on-off switch means.

15. A system as recited in calim 14, further comprising:

second remote turn-on means responsive to an off-hook signal coupled to the third input port for activating the on-off switch means.

16. A system as recited in claim 14, further comprising:

turn-off means for deactivating the on-off switch if there is no ring signal or off-hook signal for a predetermined time period.

17. A power supply system, comprising:

means for generating a first direct current from a separate source of AC input power to be used as a pirmary power source;

means for generating a second direct current from a separate source of DC input power to be used as a backup power source in the event of an interruption in the primary power source;

switching means for coupling a selected one of the first and second direct currents to a separate device to be powered and for periodically reversing the flow of the selected direct current to the device to be powered to thereby generate AC output power; and microprocessor means for monitoring the AC input power and controlling the switching means accordingly so that the first direct current is coupled to the device to be powered if the AC input power is stabilized, the second direct current is coupled to the device to be powered if the AC input power is interrupted, and current flow to the device to be powered is reversed generally in synchronism with the AC input power;

wherein the microprocessor means includes means for generating a time varying reference signal against which to compare the waveform of the AC input power for use in determining whether the AC input power is stablized or interrupted.

18. A system as recited in claim 17, wherein the microprocessor means includes:

means for generating an interruption-indicating signal if the instantaneous voltage of the AC input power at a specified phase angle exceeds a corresponding predefined value.

19. A method of providing uninterrupted power AC power, comprising:

rectifying separately supplied AC input power of a specified RMS voltage level to generate a first direct current;

up-converting separately supplied DC input power to generate a second direct current at an RMS voltage level approximately equal to that of the AC input power;

coupling a selected one of the first and second direct currents to a device to be powered according to whether the AC input power is stabilized or interrupted; and reversing the flow of direct current to the device periodically to thereby generate AC output power;

wherein the step of coupling includes:

generating a reference waveform;

comparing the waveform of the AC input power to the reference waveform to determine whether the AC input power is interrupted or stabilized; and coupling the first direct current to the device to be powered if the AC input power is stablized and coupling the second direct current to the device if the AC input power is interrupted.

20. A method as recited in claim 19, wherein the step of reversing the flow of direct current includes:

reversing the flow of the first direct current to the device in synchronism with each zero crossing of the AC input power, to thereby cause the AC output power to have a waveform generally simulating the waveform of the AC input power.

21. A method as recited in claim 19, wherein the step of reversing the flow of direct current includes:

synchronizing reversal the second direct current flow to the device with each zero crossing of the AC input power before coupling the first direct current back to the device.

22. A method as recited in claim 19, wherein the step of up-converting includes:

generating a high frequency alternating current from the input power; and transforming the high frequency alternating current to a desired RMS voltage level.

* * * * *